(12) United States Patent
Akiyama et al.

(10) Patent No.: US 10,400,617 B2
(45) Date of Patent: Sep. 3, 2019

(54) SHEET-METAL TURBINE HOUSING

(71) Applicant: MITSUBISHI HEAVY INDUSTRIES ENGINE & TURBOCHARGER, LTD., Sagamihara-shi, Kanagawa (JP)

(72) Inventors: Yoji Akiyama, Tokyo (JP); Hiroshi Suzuki, Tokyo (JP); Makoto Ozaki, Tokyo (JP)

(73) Assignee: MITSUBISHI HEAVY INDUSTRIES ENGINE & TURBOCHARGER, LTD., Sagamihara-Shi, Kanagawa (JP)

( * ) Notice: Subject to any disclaimer, the term of this patent is extended or adjusted under 35 U.S.C. 154(b) by 431 days.

(21) Appl. No.: 15/112,464

(22) PCT Filed: Feb. 28, 2014

(86) PCT No.: PCT/JP2014/055117
§ 371 (c)(1),
(2) Date: Jul. 19, 2016

(87) PCT Pub. No.: WO2015/129037
PCT Pub. Date: Sep. 3, 2015

(65) Prior Publication Data
US 2016/0341057 A1    Nov. 24, 2016

(51) Int. Cl.
*F01D 25/24*    (2006.01)
*F01D 11/00*    (2006.01)
(Continued)

(52) U.S. Cl.
CPC ............ *F01D 11/005* (2013.01); *F01D 9/026* (2013.01); *F01D 25/243* (2013.01); *F01N 13/10* (2013.01);
(Continued)

(58) Field of Classification Search
CPC ...... F01D 9/026; F01D 11/005; F01D 25/243; F05D 2240/55; F05D 2250/51;
(Continued)

(56) References Cited

U.S. PATENT DOCUMENTS 2,801,043 A * 7/1957 Spotz ..................... F01D 9/026
                                                                    277/347
7,234,302 B2 * 6/2007 Korner .................... F01D 9/026
                                                                    285/41

(Continued)

FOREIGN PATENT DOCUMENTS

DE    103 36 978 B3    1/2005
EP    0 870 966 A2    10/1998
(Continued)

OTHER PUBLICATIONS

The 2nd Office Action effective Aug. 16, 2018, issued to the corresponding Chinese Application No. 201480074224.5 with a Machine Translation.

(Continued)

*Primary Examiner* — Ninh H. Nguyen
(74) *Attorney, Agent, or Firm* — Birch, Stewart, Kolasch & Birch, LLP (57) ABSTRACT

An object is to provide a sheet-metal turbine housing free from a risk of damage to a turbine housing even if the turbine housing connected to an exhaust-gas inlet duct part is heated, and from a risk of leakage of exhaust gas through a gap between the exhaust-gas inlet duct part and the turbine housing. A sheet-metal turbine housing includes: a scroll part formed from sheet metal and forming an exhaust gas passage of a spiral shape; an exhaust-gas inlet duct part engaged with an inlet end portion of the scroll part formed into a tubular shape, for introducing exhaust gas into the exhaust gas passage of the scroll part; and a seal unit disposed on an engagement section at which the inlet end (Continued)

portion of the scroll part and the exhaust-gas inlet duct part engage with each other, to close an annular gap formed at the engagement section.

3 Claims, 6 Drawing Sheets (51) Int. Cl.
| | | |
|---|---|---|
| *F01N 13/10* | (2010.01) | |
| *F01N 13/18* | (2010.01) | |
| *F02B 37/00* | (2006.01) | |
| *F02B 67/10* | (2006.01) | |
| *F01D 9/02* | (2006.01) | |

(52) U.S. Cl.
CPC ...... *F01N 13/1811* (2013.01); *F01N 13/1827* (2013.01); *F02B 37/00* (2013.01); *F02B 67/10* (2013.01); *F05D 2220/40* (2013.01); *F05D 2230/54* (2013.01); *F05D 2240/14* (2013.01); *F05D 2240/55* (2013.01); *F05D 2250/51* (2013.01); *F05D 2250/75* (2013.01); *F05D 2260/941* (2013.01); *Y02T 10/144* (2013.01)

(58) Field of Classification Search
CPC ........... F05D 2250/75; F05D 2260/941; F01N 13/1811; F01N 13/1827
See application file for complete search history.

(56) References Cited

U.S. PATENT DOCUMENTS

| | | | | |
|---|---|---|---|---|
| 9,194,292 | B2* | 11/2015 | Yokoyama | ............. F01D 25/24 |
| 9,719,374 | B2* | 8/2017 | Maeda | ................... F01D 25/24 |
| 2004/0109759 | A1 | 6/2004 | Korner | |
| 2014/0241858 | A1 | 8/2014 | Tashiro et al. | |

FOREIGN PATENT DOCUMENTS

| | | |
|---|---|---|
| EP | 1 426 557 A1 | 6/2004 |
| EP | 2 617 961 A1 | 7/2013 |
| JP | 2004-108174 A | 4/2004 |
| JP | 2004-183651 A | 7/2004 |
| JP | 2006-194227 A | 7/2006 |
| JP | 2008-57448 A | 3/2008 |
| JP | 2009-46716 A | 3/2009 |
| JP | 2009-203803 A | 9/2009 |
| JP | 2012-211544 A | 11/2012 |
| JP | 2013-68153 A | 4/2013 |
| JP | 2013-155646 A | 8/2013 |
| JP | 2013-164076 A | 8/2013 |
| JP | 2013-170504 A | 9/2013 |

OTHER PUBLICATIONS

International Preliminary Report on Patentability and Written Opinion of the International Searching Authority (Forms PCT/IB/326, PCT/IB/338, PCT/IB/373 and PCT/ISA/237) dated Sep. 15, 2016, for International Application No. PCT/JP2014/055117 with the English translation.

International Search Report (Forms PCT/ISA/220 and PCT/ISA/210) dated Apr. 1, 2014, for International Application No. PCT/JP2014/055117.

First Office Action effective Jan. 12, 2018 issued to the corresponding Chinese Application No. 201480074224.5 with an English Machine Translation.

Extended European Search Report effective Nov. 13, 2017 issued to the corresponding EP Application No. 14884174.5.

* cited by examiner

SHEET-METAL TURBINE HOUSING

TECHNICAL FIELD

The present disclosure relates to a sheet-metal turbine housing structure used in a turbocharger which generates a boost pressure for an engine by utilizing exhaust-gas energy of the engine, especially to a structure which prevents leakage of exhaust gas through a gap formed between a scroll and an exhaust-gas inlet duct part which engages with an inlet of the scroll.

BACKGROUND ART

Typically, a known turbocharger utilizes exhaust-gas energy discharged from an engine and supplies pressurized air into an intake manifold to improve an output. If such a turbocharger is mounted to a vehicle in particular, weight reduction would be required to meet the recent need to improve fuel consumption, and heat-capacity reduction would also be required to suppress a decrease in a temperature of exhaust gas supplied to a downstream catalyst, and thus sheet-metal turbine housings are increasingly used instead of typical cast turbine housings.

Such a turbine housing has a function to take in exhaust gas of an engine and to utilize the exhaust gas to rotate a turbine wheel, and thus an inlet section of the turbine housing is heated by exhaust gas having a temperature of approximately 900° C. to 1000° C. An outlet section of the turbine housing is heated by exhaust gas having a temperature of approximately 700° C., which is reduced due to a decrease in energy from work to rotate the turbine wheel when exhaust gas flows through the turbine wheel. Accordingly, a turbine housing is a component subject to a great temperature difference, and thus to a great thermal-deformation difference between sections due to the temperature difference.

In such a turbine housing with a great thermal-deformation difference between sections, a temperature difference between an exhaust-gas inlet duct part connecting a duct disposed on an inlet of the turbine housing and an inlet area of the turbine housing connected to the exhaust-gas inlet duct part creates a thermal-deformation difference, which generates a thermal-expansion constraint force and compression thermal stress. If thermal stress is repeatedly applied, a damage such as a crack may occur in the turbine housing connected to the exhaust-gas inlet duct part.

Meanwhile, Patent Documents 1 and 2 propose a sheet-metal turbine housing structure, which is a related art.

CITATION LIST

Patent Literature

Patent Document 1: JP2013-164076A
Patent Document 2: JP2013-155646A

SUMMARY

Problems to be Solved

In the structure disclosed in Patent Document 1, an exhaust-gas inlet duct part and an inlet of a turbine housing are connected integrally, and thus a thermal-deformation difference due to a temperature difference between the exhaust-gas inlet duct part and an inlet area of the turbine housing connected thereto may generate compression thermal stress, and repetitive application of the thermal stress may create a crack in the turbine housing connected to the exhaust-gas inlet duct part.

In the structure disclosed in Patent Document 2, a guide pipe corresponding to an outlet-side turbine housing overlaps with an outlet-side end portion of an inner housing surrounding a turbine wheel, and the guide pipe is extensible. Thus, even in case of heating and thermal expansion of the guide pipe from the inner housing, there is no risk of generation of a crack in the guide pipe and the inner housing. However, there is a gap at the overlapping section between the guide pipe and the inner housing, and exhaust gas may leak out through the gap. If the exhaust-gas inlet duct part disclosed in Patent Document 1 is provided with the turbine housing in an extensible manner, in particular, a gap may be formed between the exhaust-gas inlet duct part and an inlet of the turbine housing, and exhaust gas may leak out through the gap to deteriorate turbine efficiency.

In view of the above, an object of at least some embodiments of the present invention is to provide a sheet-metal turbine housing which is free from a risk of generation of a crack in a turbine housing even if the turbine housing connected to an exhaust-gas inlet duct part is heated, as well as from a risk of leakage of exhaust gas through a gap between the exhaust-gas inlet duct part and the turbine housing.

Solution to the Problems

A sheet-metal turbine housing according to some embodiments of the present invention comprises: a scroll part which is formed from sheet metal and which forms an exhaust gas passage of a spiral shape; and an exhaust-gas inlet duct part disposed at an inlet end portion of the scroll part formed into a tubular shape, for introducing exhaust gas into the exhaust gas passage of the scroll part. The inlet end portion of the scroll part and the exhaust-gas inlet duct part are movable relative to each other while preventing leakage of exhaust gas.

The above sheet-metal turbine housing is configured such that the inlet end portion of the scroll part and the exhaust-gas inlet duct part are movable relative to each other while preventing leakage of exhaust gas, and thus, even if the scroll part gets heated by exhaust gas and expands while high-temperature exhaust gas flows through the scroll part, the inlet end portion and the exhaust-gas inlet duct part move relative to each other without letting exhaust gas leak through a gap between the inlet end portion and the exhaust-gas inlet duct part. Accordingly, it is possible to obtain a sheet-metal turbine housing free from the risk of damage such as a crack to the scroll part due to repetitive application of thermal stress and from the risk of leakage of exhaust gas through a gap between the inlet end portion and the exhaust-gas inlet duct part.

Further, in some embodiments, the scroll part and the exhaust-gas inlet duct part are provided as separate members, the exhaust-gas inlet duct part is engaged with the inlet end portion of the scroll part formed into a tubular shape, and the sheet-metal turbine housing further comprises a seal unit disposed in an engagement section at which the inlet end portion of the scroll part and the exhaust-gas inlet duct part engage with each other and configured to seal an annular gap formed at the engagement section.

In this case, the scroll part and the exhaust-gas inlet duct part are formed as separate pieces, the exhaust-gas inlet duct part is engaged with the inlet end portion of the scroll part formed in a tubular shape, and the seal unit is disposed in the engagement section at which the inlet end portion of the scroll part and the exhaust-gas inlet duct part engage with each other to seal an annular gap formed at the engagement section, and thus, even if the scroll part gets heated by exhaust gas and expands while high-temperature exhaust gas flows through the scroll part, the scroll part can move relative to the exhaust-gas inlet duct part. Further, even if a gap is formed at the engagement section at which the scroll part and the exhaust-gas inlet duct part engage with each other, the gap is closed by a blocking unit. Thus, there is no risk of generation of thermal stress at the scroll part. Accordingly, it is possible to obtain a sheet-metal turbine housing free from the risk of damage such as a crack to the scroll part due to repetitive application of thermal stress and from the risk of leakage of exhaust gas through a gap between the exhaust-gas inlet duct part and the turbine housing.

Further, in some embodiments, the seal unit is a seal member disposed along the annular gap and configured to be capable of spreading at a high-pressure side of the engagement portion.

In this case, the seal member is formed to be capable of opening wider at the high-pressure side of the engagement section, and thus, if exhaust gas tries to enter the gap, the seal member is pushed out to widen by the exhaust gas. Accordingly, the seal member comes into even closer contact with the scroll part and the exhaust-gas inlet duct part, and can close the gap more securely. It is preferable to use an annular seal ring for the seal ring.

Further, in some embodiments, the seal member is formed from a metal material into a V shape, a U shape, or a C shape in a cross sectional view, and is disposed so that an opening end is oriented opposite from an inlet of the scroll part.

In this case, the seal member is formed of a metal material, and thus, even if exhaust gas has a relatively high temperature (e.g. approximately 900° C.-1000° C.), the seal member can perform the intended function. Further, the seal member is formed into a V shape, a U shape, or a C shape in a cross sectional view, and is disposed so that an opening end of the seal member is oriented opposite from an inlet of the scroll part, and thus, if exhaust gas tries to enter the gap, the exhaust gas contacts the opening side of the V shape of the seal member to push out the seal member so that the seal member opens wider. Accordingly, the seal member comes into even closer contact with the scroll part and the exhaust-gas inlet duct part, and can close the gap more securely.

Further, in some embodiments, the exhaust-gas inlet duct part includes an inlet-duct body portion of a tubular shape engaged with the inlet end portion of the scroll part, and the seal unit is mounted inside a recessed groove formed in annular shape on an outer peripheral surface of the inlet-duct body portion of the exhaust-gas inlet part constituting the engagement section, and formed to bias, from inside, an inner peripheral surface of the inlet end portion of the scroll part which faces the outer peripheral surface.

In this case, the seal unit is mounted inside a recessed groove formed in annular shape on an outer peripheral surface of the inlet-duct body portion of the exhaust-gas inlet part constituting the engagement section, and formed to bias, from inside, an inner peripheral surface of the inlet end portion of the scroll part which faces the outer peripheral surface, and thus, even if the scroll part gets heated and expands, it is possible to prevent the risk of misalignment of the seal unit with respect to the exhaust-gas inlet duct part. Further, the seal unit biases, from inside, the inner peripheral surface of the inlet end portion of the scroll part, and thus, even if the scroll part gets heated and expands, it is possible to close a gap between the scroll part and the exhaust-gas inlet duct part.

Further, in some embodiments, an annular widened section which is widened outward in a radial direction toward an inlet side of the scroll part is disposed on the inlet end portion of the scroll part. The exhaust-gas inlet duct part includes an inlet-duct body portion of a tubular shape engaged with the inlet end portion of the scroll part, and a connecting portion disposed on an end portion of the inlet-duct body portion to connect to an exhaust manifold, an engine, or the like. The connecting portion is formed into a flange shape protruding outward in the radial direction to be formed in an annular shape. The seal unit is a seal member elastically deformable and is formed in an annular shape, the seal member being mounted to the inlet-duct body portion so as to contact an outer peripheral surface of the inlet-duct body portion of the exhaust-gas inlet duct part and an inner surface of the connecting portion, and biased toward the connecting portion by the annular widened section.

In this case, the seal unit is a seal member elastically deformable and formed in an annular shape, mounted to the inlet-duct body portion so as to contact an outer peripheral surface of the inlet-duct body portion of the exhaust-gas inlet duct part and an inner surface of the connecting portion, and biased toward the connecting portion by the annular widened section, and thus the seal member is in contact with two surfaces: the outer peripheral surface of the inlet-duct body portion and the inner surface of the connecting portion. Accordingly, it is possible to close the gap between the scroll part and the exhaust-gas inlet duct part securely. Further, if the scroll part gets heated and expands toward an extension side, the seal member gets compressed by the annular widened section to elastically deform, and comes into closer contact with the outer peripheral surface of the inlet-duct body portion and the inner surface of the connecting portion. Accordingly, it is possible to close the gap between the scroll part and the exhaust-gas inlet duct part even more securely. Furthermore, the seal member may be made from mica, and in this case, a mica seal member can be applied to a turbocharger through which exhaust gas with a relatively low temperature (e.g. approximately 900° C. or less) flows.

Further, in some embodiments, the exhaust-gas inlet duct part includes an inlet-duct body portion of a tubular shape engaged with the inlet end portion of the scroll part, and a connecting portion disposed on an end portion of the inlet-duct body portion to be connected to an exhaust manifold, an engine, or the like. The seal unit has an end connected to one of a rim of the inlet end portion of the scroll part or a radially-inner rim of the connecting portion of the exhaust-gas inlet duct part, and the other end in elastic contact with one of an outer peripheral surface of the inlet-duct body portion of the exhaust-gas inlet duct part or an inner peripheral surface of the inlet end portion of the scroll part.

In this case, the seal unit has an end connected to one of a rim of the inlet end portion of the scroll part or a radially-inner rim of the connecting portion of the exhaust-gas inlet duct part, and the other end in elastic contact with one of an outer peripheral surface of the inlet-duct body portion of the exhaust-gas inlet duct part or an inner peripheral surface of the inlet end portion of the scroll part, and thus, even if the scroll part gets heated and expands due to exhaust gas, the seal unit is maintained in a state of contacting the exhaust-gas inlet duct part or the scroll part. Accordingly, even if the scroll part expands, it is possible to keep the gap between the scroll part and the exhaust-gas inlet duct part closed constantly.

Further, in some embodiments, the other end of the seal unit includes a bend portion having a contact surface which contacts one of the outer peripheral surface of the inlet-duct body portion of the exhaust-gas inlet duct part or the inner peripheral surface of the inlet end portion of the scroll part.

In this case, the other end of the seal unit includes a bend portion having a contact surface which contacts one of the outer peripheral surface of the inlet-duct body portion of the exhaust-gas inlet duct part or the inner peripheral surface of the inlet end portion of the scroll part, and thereby the other end of the seal unit contacts one of the outer peripheral surface of the inlet-duct body portion or the inner peripheral surface of the inlet end portion of the scroll part via the contact surface. Accordingly, it is possible to bring the other end of the seal unit into secure contact with the outer peripheral surface of the inlet-duct body portion or the inner peripheral surface of the inlet end portion of the scroll part.

Further, in some embodiments, the exhaust-gas inlet duct part includes an inlet-duct body portion of a tubular shape engaged with the inlet end portion of the scroll part, and a connecting portion disposed on an end portion of the inlet-duct body portion to be connected to an exhaust manifold, an engine, or the like. The seal unit includes: a female-screw portion disposed on an inner peripheral surface of the inlet end portion of the scroll part constituting the engagement section; and a male-screw portion disposed on an outer peripheral surface of the inlet-duct body portion of the exhaust-gas inlet duct part constituting the engagement section, the male-screw portion being screwable with the female-screw portion.

In this case, the seal unit includes a female-screw portion disposed on an inner peripheral surface of the inlet end portion of the scroll part constituting the engagement section and a male-screw portion disposed on an outer peripheral surface of the inlet-duct body portion of the exhaust-gas inlet duct part constituting the engagement section, the male-screw portion being screwable with the female-screw portion, and thus, if the scroll part gets heated and expands, the expansion of the scroll part is absorbed by the clearance between the female-screw portion and the male-screw portion. Thus, it is possible to prevent the risk of generation of damage such as a crack to the scroll part. Further, since a helical-shaped gap is formed between the female screw portion and the male screw portion, the helical-shaped gap can exert a labyrinth effect to prevent passage of exhaust gas even if the exhaust gas enters the clearance between the female screw portion and the male screw portion, and thereby it is possible to prevent leakage of exhaust gas.

Further, in some embodiments, the exhaust-gas inlet duct part includes an inlet-duct body portion of a tubular shape engaged with the inlet end portion of the scroll part, and a connecting portion disposed on an end portion of the inlet-duct body portion to be connected to an exhaust manifold, an engine, or the like. The seal unit includes a bellows-shape body portion disposed on a side facing the inlet end portion of the scroll part constituting the engagement section, the bellows-shape body portion surrounding the inlet-duct body portion of the exhaust-gas inlet duct part. The bellows-shape body portion has lower rigidity than the scroll part. Opposite ends of the bellows-shape body portion are joined to a rim portion of the inlet end portion of the scroll part and an outer peripheral surface of the inlet duct body portion of the exhaust-gas inlet duct part.

In this case, the seal unit includes a bellows-shape body portion disposed on a side facing the inlet end portion of the scroll part constituting the engagement section, the bellows-shape body portion surrounding the inlet-duct body portion of the exhaust-gas inlet duct part, the bellows-shape body portion has lower rigidity than the scroll part, and opposite ends of the bellows-shape body portion are joined to a rim portion of the inlet end portion of the scroll part and an outer peripheral surface of the inlet duct body portion of the exhaust-gas inlet duct part, and thus, if the scroll part gets heated and expands, the expansion of the scroll part can be absorbed by the bellows-shape body portion. Thus, it is possible to prevent the risk of generation of damage such as a crack to the turbine housing. Further, the opposite ends of the seal unit are joined to the rim portion of the inlet end portion of the scroll part and the outer peripheral surface of the inlet-duct body portion of the exhaust-gas inlet duct part, and thus the gap between the inlet end portion of the scroll part and the exhaust-gas inlet duct part is completely closed. Accordingly, it is possible to prevent the risk of leakage of exhaust gas through the gap between the scroll part and the exhaust-gas inlet duct part.

Further, in some embodiments, the scroll part is formed from a material having a smaller linear expansion coefficient than a linear expansion coefficient of the inlet-duct body portion of the exhaust-gas inlet duct part engaging with the scroll part.

In this case, the scroll part is formed from a material having a smaller linear expansion coefficient than a linear expansion coefficient of the inlet-duct body portion of the exhaust-gas inlet duct part engaging with the scroll part, and thus, if the scroll part gets heated, the exhaust-gas inlet duct part deforms more than the scroll part does, and thereby it is possible to bring the outer peripheral surface of the exhaust-gas inlet duct part into closer contact with the inner peripheral surface of the scroll part. Accordingly, it is possible to eliminate the gap between the scroll part and the exhaust-gas inlet duct part more securely, and thus to prevent leakage of exhaust gas even more securely.

Further, in some embodiments, the scroll part and the exhaust-gas inlet duct part are formed as one piece, and the sheet-metal turbine housing further includes a connecting portion disposed on the inlet end portion of the inlet-duct part to be connected to an exhaust manifold, an engine, or the like, and a bellows-shape annular protruding portion disposed on a side of the connecting portion of the inlet duct part so as to protrude radially outward along the circumferential direction of the scroll part.

In this case, the scroll part and the exhaust-gas inlet duct part are integrally formed as one piece, and the sheet-metal turbine housing further includes a connecting portion disposed on the inlet end portion of the inlet-duct part to be connected to an exhaust manifold, an engine, or the like, and a bellows-shape annular protruding portion disposed on a side of the connecting portion of the inlet duct part so as to protrude radially outward along the circumferential direction of the scroll part, and thus, if the scroll part gets heated and expands, the expansion is absorbed by the annular protruding portion having a bellows shape. Accordingly, there is no risk of generation of thermal stress in the scroll part, and it is possible to prevent breakage of the scroll part due to thermal stress. Further, the scroll part and the exhaust-gas inlet duct part are integrally formed, and thus there is no gap between the scroll part and the exhaust-gas inlet duct part. Accordingly, it is possible to obtain a sheet-metal turbine housing free from the risk of damage to the turbine housing and from the risk of leakage of exhaust gas.

Advantageous Effects

According to at least some embodiments of the present invention, it is possible to provide a sheet-metal turbine housing which is free from the risk of generation of a crack in the turbine housing, as well as from the risk of leakage of exhaust gas through a gap between the exhaust-gas inlet duct part and the turbine housing.

DETAILED DESCRIPTION (First Embodiment)
Embodiments of a sheet-metal turbine housing of the present invention will now be described with reference to FIGS. 1 to 7. In the embodiments, described as an example is a turbocharger which rotates a turbine with exhaust-gas energy and feeds air compressed by a compressor to an internal combustion engine by utilizing rotation of the turbine. It is intended, however, that unless particularly specified, materials, shapes, relative positions and the like of components described in the embodiments shall be interpreted as illustrative only and not intended to limit the scope of the present invention.

Figure 1A:
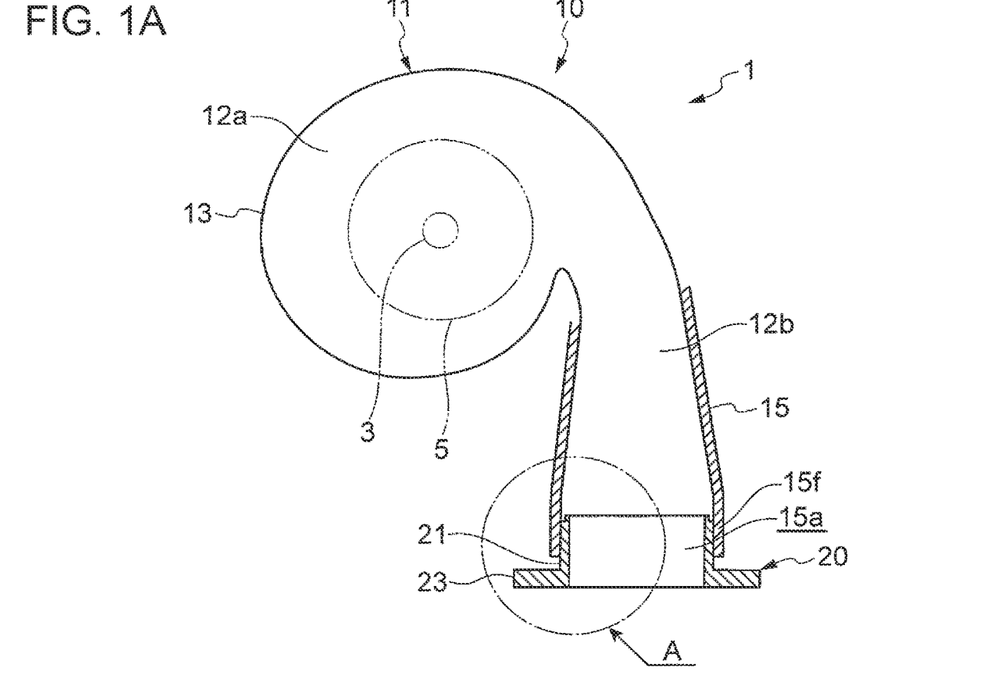
FIG. 1A is a partial cross-sectional view of a sheet-metal turbine housing according to the first embodiment of the present invention.

As depicted in FIG. 1A, a turbocharger 1 includes a turbine wheel 5 coupled to an end portion of a turbine shaft 3 supported rotatably by a bearing (not depicted), and a turbine housing 10 that surrounds the turbine wheel 5. The turbocharger 1 drives the turbine wheel 5 to rotate with exhaust-gas energy, thereby rotating a compressor wheel (not depicted) coupled to the other end portion of the turbine shaft 3 to feed air compressed by the compressor wheel to an internal combustion engine.

The turbine housing 10 includes a scroll part 11 and an exhaust-gas inlet duct part 20 connected to an inlet end portion 15f of the scroll part 11. The scroll part 11 is formed by two pressed sheet-metal members combined, and the combined section is welded to form an exhaust-gas passage 12a of a spiral shape therein. The scroll part 11 includes a scroll-body part 13 which forms the exhaust-gas passage 12a of a spiral shape, and an exhaust-gas guide part 15 which guides exhaust gas to the scroll-body part 13.

The exhaust-gas guide part 15 is formed into a tubular shape, and an exhaust-gas passage 12b of a tubular shape is formed inside the exhaust-gas guide part 15. An exhaust-gas inlet duct part 20 is engaged with the inlet end portion 15f of the exhaust-gas guide part 15.

Figure 1B:
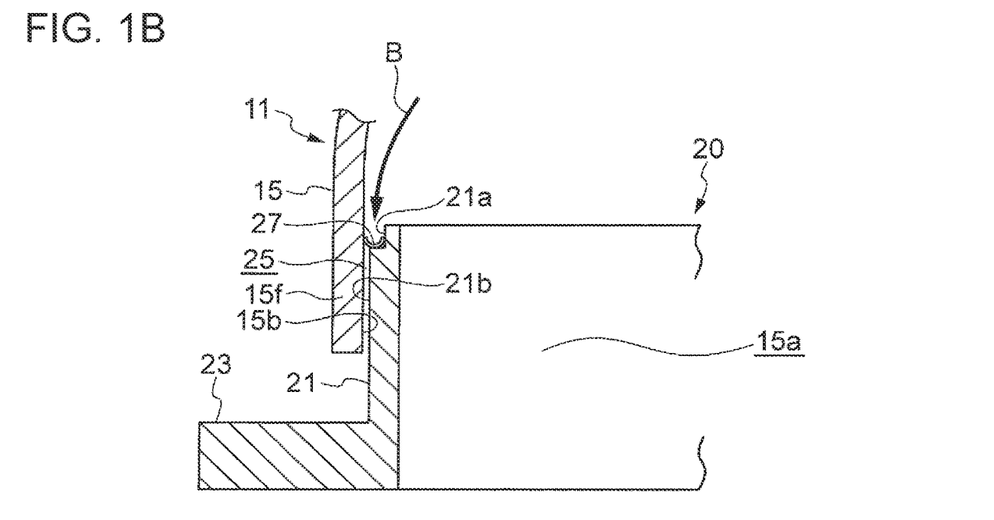
FIG. 1B is an enlarged view of a section indicated by arrow A in FIG. 1A.

The exhaust-gas inlet duct part 20 is formed from a metal material (e.g. stainless steel), and includes an inlet-duct body portion 21 of a tubular shape and a connecting portion 23 disposed on an end portion of the inlet-duct body portion 21 to connect to an exhaust manifold, an engine, or the like. As depicted in FIG. 1B, the inlet-duct body portion 21 has a contour which is substantially similar to the contour of the inlet end portion 15f of the exhaust-gas guide part 15, but slightly smaller. Thus, the inlet-duct body portion 21 engages with the inlet end portion 15f of the exhaust-gas guide part 15 via a slight gap 25. Thus, the exhaust-gas guide part 15 can slide relative to the inlet-duct body portion 21. Further, an exhaust duct (not depicted) for transferring exhaust gas discharged from the internal combustion engine is connected to the connecting portion 23.

A stepped portion 21a is disposed on a distal end portion of the inlet-duct body portion 21 of the exhaust-gas inlet duct part 20, along the contour of the inlet-duct body portion 21. A seal member 27 is mounted to the stepped portion 21a, while contacting an inner peripheral surface 15b of the exhaust-gas guide part 15 and an outer peripheral surface of the stepped portion 21a to close a gap 25 formed between the exhaust-gas guide part 15 and the inlet-duct body portion 21. The seal member 27 is formed from a metal material (e.g. stainless steel, nickel alloy, or the like), into a V shape, a U shape, or a C shape in cross-section. The seal member 27 is disposed so that an opening end portion faces in the opposite direction from an inlet 15a of the exhaust-gas guide part 15.

Thus, if exhaust gas deviates in the direction of arrow B and tries to enter the gap 25 while flowing through the exhaust-gas passage 12b of the scroll part 11 via the exhaust-gas inlet duct part 20, the exhaust gas contacts a surface on the opening side of the seal member 27 and pushes out the seal member 27 in such a direction that the seal member 27 opens wider. Accordingly, the seal member 27 comes into closer contact with the inner peripheral surface 15b of the exhaust-gas guide part 15 and the outer peripheral surface of the stepped portion 21a, and can close the gap 25 securely. As a result, it is possible to eliminate the risk of leakage of exhaust gas through the gap 25.

Further, preferably, the contour of the inlet-duct body portion 21 and the contour of the inlet end portion 15f of the exhaust-gas guide part 15 are formed into a substantially circular shape, and the seal member is an annular seal ring.

Accordingly, a pressure of exhaust gas is evenly applied to the seal ring, and thereby it is possible to prevent a local pressure increase of exhaust gas and to eliminate the risk of leakage of exhaust gas. Further, the seal ring can have a substantially circular shape and a uniform rigidity can be achieved between different sections of the seal ring, and thereby the seal ring opens wider evenly along the gap, which makes it possible to eliminate the risk of leakage of exhaust gas.

Further, since the exhaust gas flowing through the exhaust-gas inlet duct part 20 into the exhaust-gas guide part 15 has a temperature of approximately 900° C. to 1000° C., deformation (expansion) of the exhaust-gas guide part 15 is relatively large. If this deformation (expansion) is restrained, thermal stress may be generated at the exhaust-gas guide part 15, and repetitive application of the thermal stress may raise the risk of damage to the exhaust-gas guide part 15, such as a crack. However, as described above, the gap 25 is formed between the exhaust-gas guide part 15 and the inlet-duct body portion 21, and the exhaust-gas guide part 15 is movable relative to the inlet-duct body portion 21. Accordingly, even in case of deformation (expansion) of the exhaust-gas guide part 15 from being heated by exhaust gas, the exhaust-gas guide part 15 moves relative to the inlet-duct body portion 21, and thus thermal stress would not be generated in the exhaust-gas guide part 15, and thus there is no risk of damage to the exhaust-gas guide part 15 due to thermal stress.

Figure 2A:
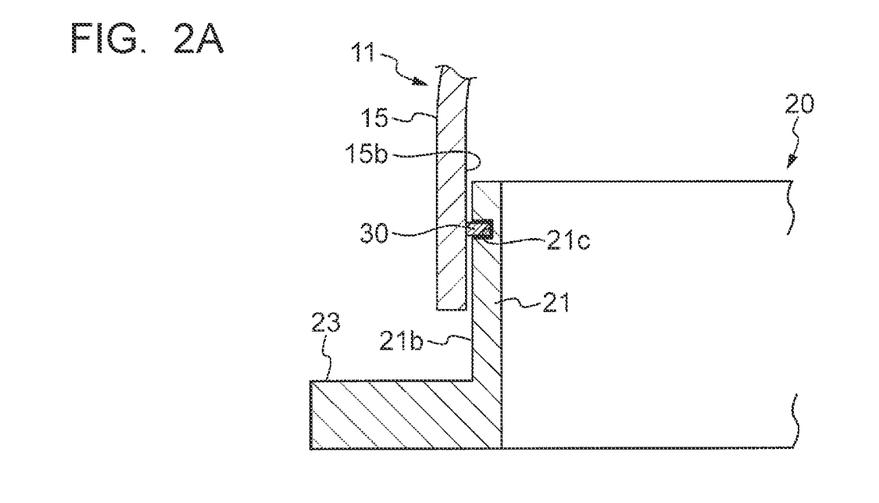
FIG. 2A is a partial cross-sectional view of a sheet-metal turbine housing, where a piston ring is used as a blocking unit according to the first embodiment of the present invention.

As depicted in FIG. 2A, the seal member 27 may be a piston ring 30 formed from a metal material (e.g. stainless steel). In this case, an annular groove 21c which extends in the circumferential direction and to which the piston ring 30 is mountable is disposed on the outer peripheral surface 21b at a distal end side of the inlet-duct body portion 21 of the exhaust-gas inlet duct part 20. With the piston ring 30 mounted to the annular groove 21c with elasticity, it is possible to mount the piston ring 30 to the annular groove 21c firmly. The piston ring 30 is configured so that the outer peripheral surface of the piston ring 30 contacts the inner peripheral surface 15b of the exhaust-gas guide part 15.

As described above, with the piston ring 30 provided for the exhaust-gas inlet duct part 20, it is possible to obtain the sheet-metal turbine housing 10 free from the risk of leakage of exhaust gas through the gap 25 (see FIG. 1B) and from the risk of breakage of the exhaust-gas guide part 15 due to thermal stress, similarly to the case with the seal member 27 (see FIG. 1B) formed into a V shape, a U shape, or a C shape in cross-section.

Figure 2B:
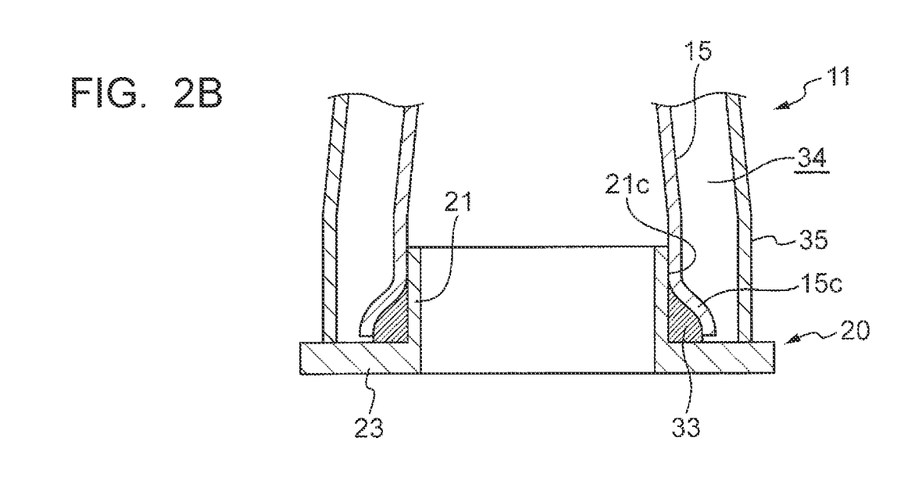
FIG. 2B is a partial cross-sectional view of a sheet-metal turbine housing, where a mica seal member is used as a blocking unit.

Further, the seal member 27 may be a seal member 33 formed from mica, as depicted in FIG. 2B. The seal member 33 is formed to have a circular shape in cross-section, and is elastically deformable. In this case, the upper limit of the temperature of exhaust gas should be approximately 700° C. to 800° C. This is because, if the temperature of exhaust gas exceeds the upper limit of approximately 700° C. to 800° C., mica transforms and deteriorates the function of the seal member 33. Further, the exhaust-gas guide part 15 of the scroll part 11 has a dual structure. That is, a cover part 35 which surrounds the exhaust-gas guide part 15 via a space section 34 is disposed radially outside the exhaust-gas guide part 15. The cover part 35 will be described below in detail.

The seal member 33 formed from mica is mounted to the outer peripheral surface 21b of the inlet-duct body portion 21 and the connecting portion 23 of a flange shape, in an elastically-deformed state. The exhaust-gas guide part 15 is engaged with the outer peripheral surface 21b of the inlet-duct body portion 21 via the gap 25 (see FIG. 1B). An annular widened section 15c which spreads outward in the radial direction and which contacts the seal member 33 is formed on an end portion on the side of the inlet 15a of the exhaust-gas guide part 15. Accordingly, even in case of deformation (expansion) of the exhaust-gas guide part 15 from being heated by exhaust gas, the annular widened section 15c compresses the seal member 33 formed from mica to absorb the deformation (expansion) of the exhaust-gas guide part 15. As a result, it is possible to prevent breakage of the exhaust-gas guide part 15 due to thermal stress.

The seal member 33 formed from mica is mounted to the outer peripheral surface 21b of the inlet-duct body portion 21 and the connecting portion 23 of a flange shape, in a contacting state. Further, if the exhaust-gas guide part 15 deforms (expands) due to heat, the seal member 33 is pressed further by the annular widened section 15c to come into close contact with the outer peripheral surface 21b of the inlet-duct body portion 21 and the connecting portion 23 of a flange shape. Accordingly, there is no risk of leakage of exhaust gas through the gap 25 (see FIG. 1B) between the exhaust-gas guide part 15 and the inlet-duct body portion 21.

Further, the cover part 35 surrounding the exhaust-gas guide part 15 is formed from sheet-metal (e.g. stainless steel) into a tubular shape, and an end portion of the cover part 35 is joined to a radially outer side of an inner surface of the connecting portion 23 of the exhaust-gas inlet duct part 20 by welding or brazing, and the other end portion of the cover part 35 is joined to an outer surface of the scroll part 11 by welding or brazing. Thus, even in case of leakage of exhaust gas through the seal member 33 formed from mica, it is possible to prevent leakage of exhaust gas to the outer side securely with the cover part 35.

(Second Embodiment)

Figure 3A:
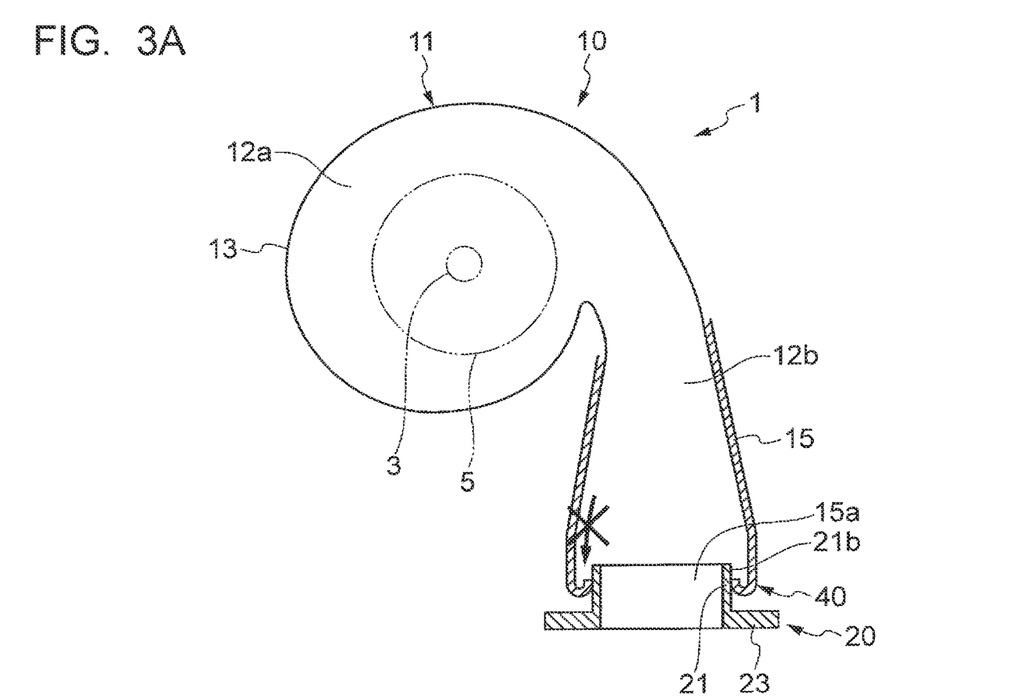
FIG. 3A is a partial cross-sectional view of a sheet-metal turbine housing with a blocking unit including an inlet end portion of a scroll part coming into elastic contact with an exhaust-gas inlet duct part, according to the second embodiment of the present invention.

Next, the second embodiment of the turbine housing 10 will now be described with reference to FIGS. 3A and 3B. For the second embodiment, only the differences from the first embodiment will be described, and the same features as those in the first embodiment will be indicated by the same reference numerals and not described in detail. As depicted in FIG. 3A, a seal portion 40 is formed on an end portion on the inlet 15a side of the exhaust-gas guide part 15, bended in an arc shape inward in the radial direction of the exhaust-gas guide part 15 so as to have an annular shape in the circumferential direction of the exhaust-gas guide part 15.

The seal portion 40 is formed by press processing, for instance. The seal portion 40 is in elastic contact with the outer peripheral surface 21b of the inlet-duct body portion 21 of the exhaust-gas inlet duct part 20. This configuration reduces the risk of generation of a gap between the seal portion 40 and the outer peripheral surface 21b of the inlet-duct body portion 21. Further, since the seal portion 40 is bended in an arc shape inward in the radial direction of the exhaust-gas guide part 15, if exhaust gas flows toward the seal portion 40, the seal portion 40 is widened by the exhaust gas, and thus is pressed against the inlet-duct body portion 21 more firmly. Accordingly, it is possible to prevent the risk of leakage of exhaust gas through a gap between the seal portion 40 and the inlet-duct body portion 21 more securely. Further, since the seal portion 40 is in elastic contact with the inlet-duct body portion 21, if the exhaust-gas guide part 15 deforms (expands) from being heated by exhaust gas, the seal portion 40 slides on the outer peripheral surface 21b of the inlet-duct body portion 21. Accordingly, there is no risk of generation of thermal stress in the exhaust-gas guide part 15, and it is possible to prevent breakage of the exhaust-gas guide part 15 due to thermal stress.

Figure 3B:
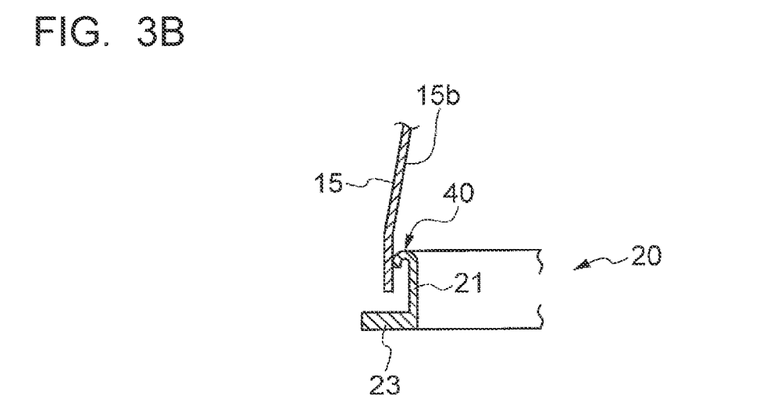
FIG. 3B is a partial cross-sectional view of a sheet-metal turbine housing with a blocking unit including an exhaust-gas inlet duct part coming into elastic contact with an inlet end portion of a scroll part, according to the second embodiment of the present invention.

The seal portion 40 may be disposed on a distal end portion of the inlet-duct body portion 21 of the exhaust-gas inlet duct part 20, as depicted in FIG. 3B. In this case, the connecting portion 23 of the exhaust-gas inlet duct part 20 is formed by casting and machine processing, for instance, and the inlet-duct body portion 21 is formed by press-processing sheet metal, the connecting portion 23 and the inlet-duct body portion 21 being connected to each other by welding or the like. The seal portion 40 is formed on an end portion of the inlet-duct body portion 21, and bended in arc shape outward in the radial direction of the inlet-duct body portion 21 to extend in an annular shape in the circumferential direction of the inlet-duct body portion 21. The seal portion 40 is in elastic contact with the inner peripheral surface 15b of the exhaust-gas guide part 15.

(Third Embodiment)

Figure 4:
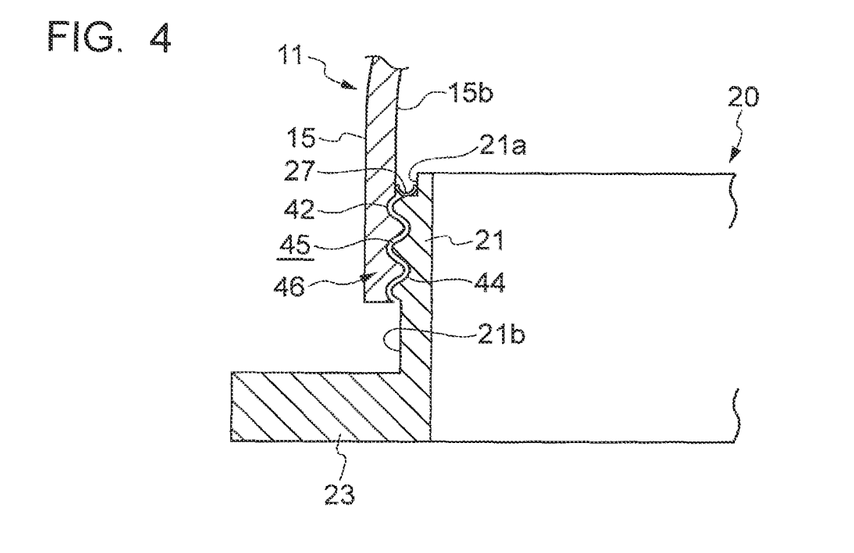
FIG. 4 is a partial cross-sectional view of a sheet-metal turbine housing with a blocking unit including a labyrinth structure disposed on a scroll part and an exhaust-gas inlet duct part, according to the third embodiment of the present invention.

Next, the third embodiment of the turbine housing 10 will now be described with reference to FIG. 4. For the third embodiment, only the differences from the first embodiment will be described, and the same features as those in the first embodiment will be indicated by the same reference numerals and not described in detail. As depicted in FIG. 4, a female screw portion 42 is disposed on the inner peripheral surface 15b of the exhaust-gas guide part 15, and a male screw portion 44 which can be screwed with the female screw portion 42 is formed on the outer peripheral surface 21b of the inlet-duct body portion 21, the female screw portion 42 and the male screw portion 44 forming a seal portion 46. The female screw portion 42 and the male screw portion 44 have a backlash in the vertical direction on the drawing, and a labyrinth structure is formed between the female screw portion 42 and the male screw portion 44 when the female screw portion 42 and the male screw portion 44 are screwed.

Further, for each of the female screw portion 42 and the male screw portion 44, the thread angle or the width in the vertical direction of the drawing may be reduced as compared to general structural screws, so as to positively increase the backlash in the vertical direction of the drawing.

Thus, if the exhaust-gas guide part 15 of the scroll part 11 gets heated and expands, the backlash in the vertical direction of the drawing absorbs the expansion of the exhaust-gas guide part 15. Accordingly, thermal stress is not generated in the exhaust-gas guide part 15, and it is possible to prevent damage to the exhaust-gas guide part 15 due to thermal stress. Further, since a labyrinth structure is formed between the female screw portion 42 and the male screw portion 44, the labyrinth structure can prevent passage of exhaust gas even if the exhaust gas enters the clearance between the female screw portion 42 and the male screw portion 44, and thereby it is possible to prevent leakage of exhaust gas.

In FIG. 4, the seal member 27 of a V shape, a U shape, or a C shape in cross section as described above is mounted to the inlet-duct body portion 21. Accordingly, leakage of exhaust gas can be securely prevented by cooperation of the seal member 27 and the seal portion 46 having a labyrinth structure. It should be noted that the seal member 27 is unnecessary if leakage of exhaust gas can be prevented securely by the seal portion 46 having a labyrinth structure alone.

(Fourth Embodiment)

Figure 5:
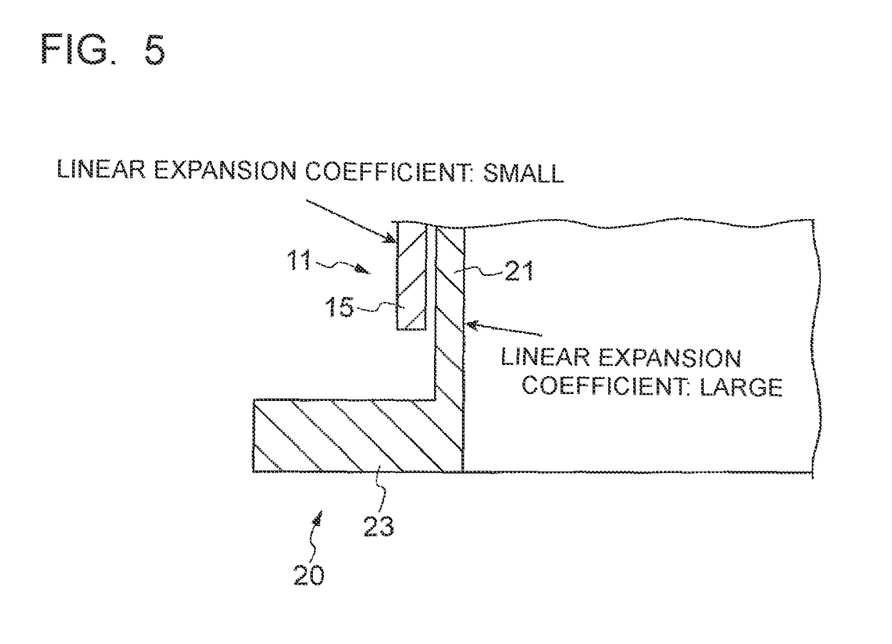
FIG. 5 is a partial cross-sectional view of a sheet-metal turbine housing according to the fourth embodiment, where a scroll part and an exhaust-gas inlet duct part forming a blocking unit have different linear expansion coefficients.

Next, the fourth embodiment of the turbine housing 10 will now be described with reference to FIG. 5. For the fourth embodiment, only the differences from the second and third embodiments will be described, and the same features as those in the second and third embodiments will be indicated by the same reference numerals and not described in detail. The exhaust-gas guide part 15 of the scroll part 11 is formed from a material having a smaller linear expansion coefficient than the inlet-duct body portion 21 of the exhaust-gas inlet duct part 20 engaged with the exhaust-gas guide part 15, as depicted in FIG. 5. In this case, the exhaust-gas guide part 15 is formed from ferrite stainless steel, and the inlet-duct body portion 21 is formed from austenite stainless steel, for instance.

As describe above, with the exhaust-gas guide part 15 being formed from a material having a smaller linear expansion coefficient than the inlet-duct body portion 21, the inlet-duct body portion 21 deforms more than the exhaust-gas guide part 15 does when the scroll part 11 and the exhaust-gas inlet duct part 20 are heated by exhaust gas flowing thereto. Thus, it is possible to bring the inner peripheral surface 15b of the exhaust-gas guide part 15 and the outer peripheral surface 21b of the inlet-duct body portion 21 into close contact, and to eliminate the gap between the exhaust-gas guide part 15 and the inlet-duct body portion 21 more securely. Accordingly, it is possible to prevent leakage of exhaust gas more securely. Further, if the temperature is equal to or lower than a temperature at which the outer peripheral surface 21b of the inlet-duct body portion 21 comes into close contact with the inner peripheral surface 15b of the exhaust-gas guide part 15, the inner peripheral surface 15b slides on the outer peripheral surface 21b in response to deformation (expansion) of the exhaust-gas guide part 15 from being heated by exhaust gas. Accordingly, there is no risk of generation of thermal stress in the exhaust-gas guide part 15, and it is possible to prevent breakage of the exhaust-gas guide part 15 due to thermal stress.

(Fifth Embodiment)

Figure 6:
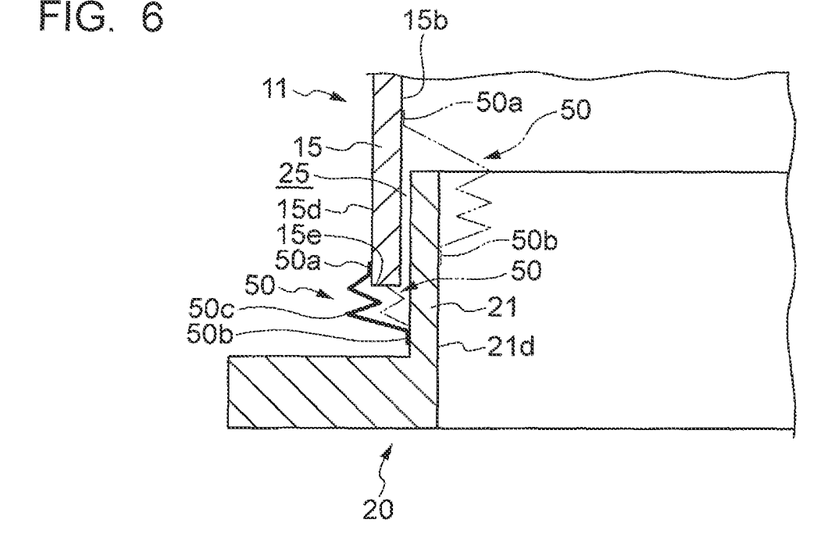
FIG. 6 is a partial cross-sectional view of a sheet-metal turbine housing with a blocking unit of a bellows shape disposed between a scroll part and an exhaust-gas inlet duct part, according to the fifth embodiment of the present invention.

Next, the fifth embodiment of the turbine housing 10 will now be described with reference to FIG. 6. For the fifth embodiment, only the differences from the first embodiment will be described, and the same features as those in the first embodiment will be indicated by the same reference numerals and not described in detail. As depicted in FIG. 6, a seal portion 50 is disposed on the exhaust-gas guide part 15 of the scroll part 11 and the inlet-duct body portion 21 of the exhaust-gas inlet duct part 20, the seal portion 50 connecting the exhaust-gas guide part 15 and the inlet-duct body portion 21 and being extensible. The seal portion 50 includes an end portion 50a connected to the outer peripheral surface 15d of the exhaust-gas guide part 15 so as to close the inlet 15a of the exhaust-gas guide part 15, the other end portion 50b connected without a gap in an annular shape along the outer peripheral surface 21b of the inlet-duct body portion 21, and a bellows-shape body portion 50c which is connected between the one end portion 50a and the other end portion 50b and which has a lower rigidity than the exhaust-gas guide part 15. The seal portion 50 includes, for instance, thin sheet metal folded several times to form the bellows-shape body portion 50c in an elastically deformable manner. The one end portion 50a and the other end portion 50b of the seal portion 50 are fixed to the exhaust-gas guide part 15 and the inlet-duct body portion 21 by welding or brazing.

Thus, if the exhaust-gas guide part 15 of the scroll part 11 gets heated and expands, the bellows-shape body portion 50c of the seal portion 50 contracts and absorbs the expansion of the exhaust-gas guide part 15. Accordingly, there is no risk of generation of thermal stress in the exhaust-gas guide part 15, and it is possible to prevent damage to the exhaust-gas guide part 15 due to thermal stress. Further, since the seal portion 50 is connected to the exhaust-gas guide part 15 and the inlet-duct body portion 21 at both end portions by welding, there is no risk of leakage of exhaust gas to outside even if the exhaust gas flows into the gap 25 between the exhaust-gas guide part 15 and the inlet-duct body portion 21.

The one end portion 50a of the seal portion 50 may not be necessarily connected to the outer peripheral surface 15d of the exhaust-gas guide part 15, and may be connected to an end portion 15e of the exhaust-gas guide part 15 as indicated by the two-dotted chain line. Alternatively, the seal portion 50 may be disposed inside the exhaust-gas guide part 15 and the inlet-duct body portion 21. Specifically, the seal portion 50 may be connected to the inner peripheral surface 15b of the exhaust-gas guide part 15 at the one end portion 50a, and to the inner peripheral surface 21d of the inlet-duct body portion 21 at the other end portion 50b, as shown with two-dotted chain line.

(Sixth Embodiment)

Figure 7:
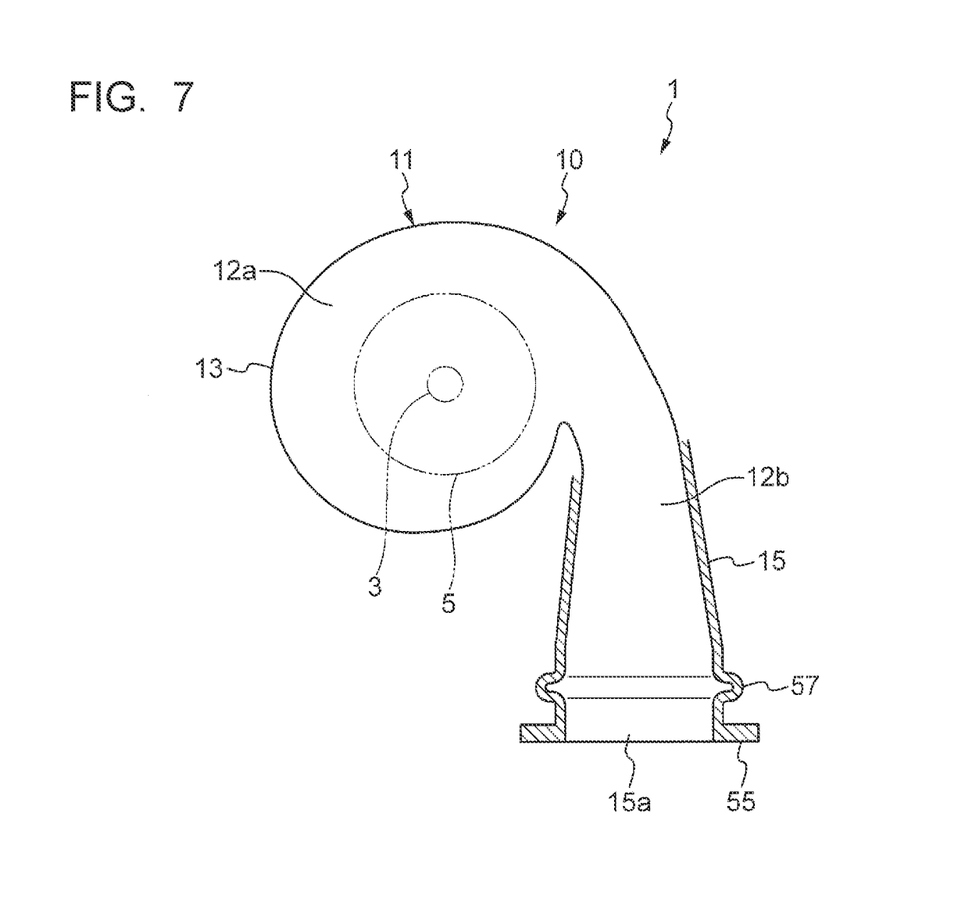
FIG. 7 is a partial cross-sectional view of a sheet-metal turbine housing including an bellows-shape annular protruding portion according to the sixth embodiment of the present invention, where a scroll part and an exhaust-gas inlet duct part are integrally formed.

Next, the sixth embodiment of the turbine housing 10 will now be described with reference to FIG. 7. For the sixth embodiment, only the differences from the first embodiment will be described, and the same features as those in the first embodiment will be indicated by the same reference numerals and not described in detail. As depicted in FIG. 7, a connecting portion 55 for connecting to an exhaust manifold, an engine, or the like is disposed on an end portion in the radial direction of the inlet 15a of the exhaust-gas guide part 15 of the scroll part 11. Further, an annular protruding portion 57 of a bellows shape, protruding outward in the radial direction along the circumferential direction of the exhaust-gas guide part 15, is disposed on the connecting-portion 55 side of the exhaust-gas guide part 15. The annular protruding portion 57 is formed by press processing, for instance. The connecting portion 55 is formed by casting and mechanical processing, for instance, and connected to an end portion in the radial direction of the inlet 15a of the exhaust-gas guide part 15 by welding or the like.

The annular protruding portion 57 elastically deforms as if to be compressed, and thereby flexurally deforms, in response to deformation (expansion) of the exhaust-gas guide part 15 from being heated. Specifically, the rigidity of the annular protruding portion 57 is set to be smaller than the rigidity of the exhaust-gas guide part 15. Thus, it is possible to absorb deformation of the exhaust-gas guide part 15 with the annular protruding portion 57. Accordingly, there is no risk of generation of thermal stress in the exhaust-gas guide part 15, and it is possible to prevent damage to the exhaust-gas guide part 15 due to thermal stress. Further, since the exhaust-gas guide part 15 and the connecting portion 55 are integrally formed, there is no risk of leakage of exhaust gas that flows into the exhaust-gas guide part 15. Accordingly, it is possible to prevent reduction of an amount of exhaust gas to be supplied to the turbine wheel 5. Thus, it is possible to prevent deterioration of performance of the turbocharger 1, which supplies pressurized air to an internal combustion engine by rotating a compressor wheel with rotation of the turbine wheel 5.

The embodiments of the present invention have been described above. However, the present invention is not limited thereto, and various modifications may be applied as long as they do not depart from the object of the present invention. For instance, some of the above described embodiments may be combined upon implementation.

DESCRIPTION OF REFERENCE NUMERAL

1 Turbocharger
3 Turbine shaft
5 Turbine wheel
10 Turbine housing
11 Scroll part
12a, 12b Exhaust-gas passage
13 Scroll-body part
15 Exhaust-gas guide part
15a Inlet
15b Inner peripheral surface
15c Annular widened section
15d Outer peripheral surface
15e End portion
15f Inlet end portion
20 Exhaust-gas inlet duct part
21 Inlet-duct body portion
21a Stepped portion
21b Outer peripheral surface
21c Annular groove
21d Inner peripheral surface
23, 25 Connecting portion
25, 45 Gap
27 Seal member
30 Piston ring
33 Mica seal member
34 Space section
35 Cover part
40, 46, 50 Seal portion
42 Female screw portion
44 Male screw portion
50a One end portion
50b Other end portion
50c Bellows-shape body portion
57 Annular protruding portion

The invention claimed is:

1. A sheet-metal turbine housing, comprising;
a scroll part which is formed from sheet metal and which forms an exhaust gas passage of a spiral shape; and
an exhaust-gas inlet duct part disposed at an inlet end portion of the scroll part formed into a tubular shape, for introducing exhaust gas into the exhaust gas passage of the scroll part,
wherein the inlet end portion of the scroll part and the exhaust-gas inlet duct part are movable relative to each other while preventing leakage of exhaust gas,
wherein the scroll part and the exhaust-gas inlet duct part are provided as separate members,
wherein the exhaust-gas inlet duct part is engaged with the inlet end portion of the scroll part formed into a tubular shape,
wherein the sheet-metal turbine housing further comprises a seal unit disposed in an engagement section at which the inlet end portion of the scroll part and the exhaust-gas inlet duct part engage with each other and configured to seal an annular gap formed at the engagement section,
wherein the seal unit is a seal member disposed along the annular gap and configured to be capable of spreading at a high-pressure side of the engagement portion, and
wherein the seal member is formed from a metal material into a V shape, a U shape, or a C shape in a cross sectional view, and is disposed so that an opening end is oriented opposite from an inlet of the scroll part.

2. A sheet-metal turbine housing, comprising:
a scroll part which is formed from sheet metal and which forms an exhaust gas passage of a spiral shape; and
an exhaust-gas inlet duct part disposed at an inlet end portion of the scroll part formed into a tubular shape, for introducing exhaust gas into the exhaust gas passage of the scroll part,
wherein the inlet end portion of the scroll part and the exhaust-gas inlet duct part are movable relative to each other while preventing leakage of exhaust gas, wherein the scroll part and the exhaust-gas inlet duct part are provided as separate members, wherein the exhaust-gas inlet duct part is engaged with the inlet end portion of he scroll part formed into a tubular shape, wherein the exhaust-gas inlet duct part includes an inlet-duct body portion of a tubular shape engaged with the inlet end portion of the scroll part, and wherein the seal unit is mounted inside a recessed groove formed in annular shape on an outer peripheral surface of the inlet-duct body portion of the exhaust-gas inlet part constituting the engagement section, and formed to bias, from inside, an inner peripheral surface of the inlet end portion of the scroll part which faces the outer peripheral surface.

3. A sheet-metal turbine housing, comprising:

a scroll part which is formed from sheet metal and which forms an exhaust gas passage of a spiral shape; and an exhaust-gas inlet duct part disposed at an inlet end portion of the scroll part formed into a tubular shape, for introducing exhaust gas into the exhaust gas passage of the scroll part, wherein the inlet end portion of the scroll part and the exhaust-gas inlet duct part are movable relative to each other while preventing leakage of exhaust gas, wherein the scroll part and the exhaust-gas inlet duct part are provided as separate members, wherein the exhaust-gas inlet duct par is engaged with the inlet end portion of the scroll part formed into a tubular shape, wherein an annular widened section which is widened outward in a radial direction toward an inlet side of the scroll part is disposed on the inlet end portion of the scroll part, wherein the exhaust-gas inlet duct part includes an inlet-duct body portion of a tubular shape engaged with the inlet end portion of the scroll part, and a connecting portion of a flange shape disposed on an end portion of the inlet-duct body portion so as to protrude outward in the radial direction and formed in an annular shape, and wherein the seal unit is a seal member elastically deformable and is formed in an annular shape, the seal member being mounted to the inlet-duct body portion so as to contact an outer peripheral surface of the inlet-duct body portion of the exhaust-gas inlet duct part and an inner surface of the flange portion, and biased toward the flange portion by the annular widened section.

* * * * *